United States Patent [19]
Narita et al.

[11] Patent Number: 5,304,102
[45] Date of Patent: Apr. 19, 1994

[54] CONTROL FOR SHIFT IN AUTOMATIC TRANSMISSION

[75] Inventors: Yasushi Narita; Yusuke Minagawa, both of Yokohama, Japan

[73] Assignee: Nissan Motor Co., Ltd., Yokohama, Japan

[21] Appl. No.: 838,667

[22] Filed: Feb. 21, 1992

[30] Foreign Application Priority Data

Feb. 21, 1991 [JP] Japan ................................. 3-27068
May 31, 1991 [JP] Japan ................................ 3-156126

[51] Int. Cl.$^5$ .............................................. F16H 59/16
[52] U.S. Cl. ...................................... 475/125; 74/866
[58] Field of Search ............. 74/866, 880, 882, 730.1, 74/731.1, 336 R, 337; 475/125

[56] References Cited

U.S. PATENT DOCUMENTS

| | | | |
|---|---|---|---|
| 3,251,247 | 5/1966 | Lamburn | 475/125 |
| 4,220,058 | 9/1980 | Petzold | 475/125 |
| 4,517,859 | 5/1985 | Nagaoka et al. | 74/337 X |
| 4,527,678 | 7/1985 | Pierce et al. | 74/866 X |
| 4,601,218 | 7/1986 | Bohle | 475/125 |
| 4,680,988 | 7/1987 | Mori | 74/866 |
| 4,685,356 | 8/1987 | Iwatsuki | 74/866 |
| 4,709,596 | 12/1987 | Boda et al. | 74/866 X |
| 4,732,246 | 3/1988 | Tateno et al. | 74/336 R X |
| 4,790,418 | 12/1988 | Brown et al. | 74/336 R X |
| 4,953,090 | 8/1990 | Narita | 364/424.1 |
| 4,977,797 | 12/1990 | Aoki et al. | 74/731.1 X |
| 4,989,477 | 2/1991 | Hunter et al. | 74/336 R X |
| 5,053,963 | 10/1991 | Mauk | 74/866 X |

FOREIGN PATENT DOCUMENTS

| | | |
|---|---|---|
| 63-120945 | 5/1988 | Japan . |
| 2212871 | 8/1989 | United Kingdom . |
| 2239065 | 6/1991 | United Kingdom . |

OTHER PUBLICATIONS

Leising et al., "The All-Adaptive Controls For The Chrysler Ultradrive Transaxle", Chrysler Motors Corp., 890529, pp. 45-53.
Leising et al., "Adaptive Control Strategies For Clutch--to Clutch Shifting", Chrysler Motors Co., 805048, pp. 331-339.
Service Manual, "Nissan Full-Range Electronically Controlled Automatic Transmission RE4R01A Type", (A2601C07) pp. I-53-I-73, Mar. 1987.

*Primary Examiner*—Dirk Wright
*Attorney, Agent, or Firm*—Foley & Lardner

[57] ABSTRACT

There is proposed a practical approach to a shift, in an automatic transmission, in which a release element is released and an apply element is engaged. The release element is released or vented at an appropriate timing after development of torque by the apply element but before initiation of inertia phase. Specifically, the release element is released when transmission output torque (To) reaches a value (Toh) calculated out of gear ratio after shift (grmin), transmission input (or turbine) torque (Tt) and transmission input (turbine) acceleration (NTd). If desired, without relying on measurement of output torque (To), the release element may be released when transmission output acceleration (No), namely, vehicle acceleration, reaches a value which may be fixed or accelerator position dependent.

11 Claims, 8 Drawing Sheets

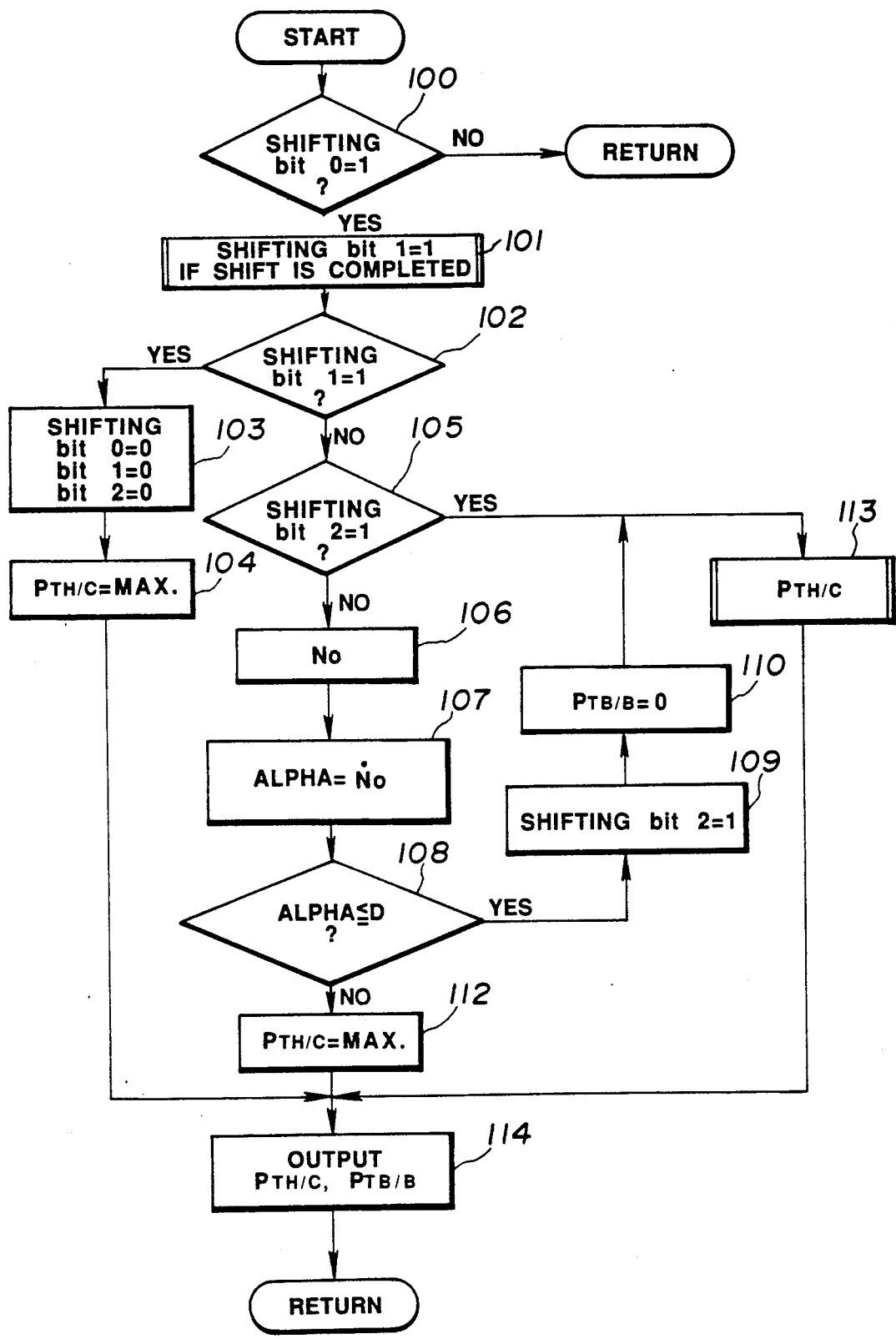

CONTROL FOR SHIFT IN AUTOMATIC TRANSMISSION

BACKGROUND OF THE INVENTION

The present invention relates to a control for shifting in automatic transmission.

As in SAE papers 890529 and 905048, there has been proposed a practical approach to an adaptive control for a so-called clutch-to-clutch shifting in an automatic transmission.

An object of the present invention is to improve such an adaptive control such that an engine racing or so-called inescapable torque drop during torque phase are effectively suppressed to improve quality of shift.

SUMMARY OF THE INVENTION

According to the present invention, there is provided a method of a shift control for an automatic transmission having an input member, an output member and a plurality of friction elements, the plurality of friction elements including one which serves as a release element during a shift and another which serves as an apply element during the shift, the automatic transmission effects the shift wherein the release element is released and the apply element is engaged, the method comprising the steps of:

initiating progress of engagement of the apply element;

detecting a predetermined variable regarding dynamic state of the output member;

determining whether said detected predetermined variable is subject to a change induced by initiation of development of torque by the apply element; and releasing the release element upon determining said detected predetermined variable being subject to said change.

According to another aspect of the present invention, there is provided a system for a shift control for an automatic transmission having an input member, an output member and a plurality of friction elements, the plurality of friction elements including one which serves as a release element during a shift and another which serves as an apply element during the shift, the automatic transmission effects the shift wherein the release element is released and the apply element is engaged, the system comprising:

means for detecting a predetermined variable regarding dynamic state of the output member;

a control unit including, means for generating an apply signal after a command for the shift has been made; and means for determining whether said detected predetermined variable is subject to a change induced by initiation of development of torque by the apply element and generating a release signal upon determining said detected predetermined variable being subject to said change; and means for initiating progress of engagement of the apply element upon generation of said apply signal with the release element kept engaged and releasing the release element upon generation of said release signal.

BRIEF DESCRIPTION OF THE DRAWINGS

FIG. 10 is a flow diagram of a shift control routine.

DETAILED DESCRIPTION OF THE INVENTION

Referring to the accompanying drawings, a first embodiment is explained in connection with FIGS. 1 to 8 and a second embodiment is explained in connection with FIGS. 1, 2, 9 and 10.

Figure 1:
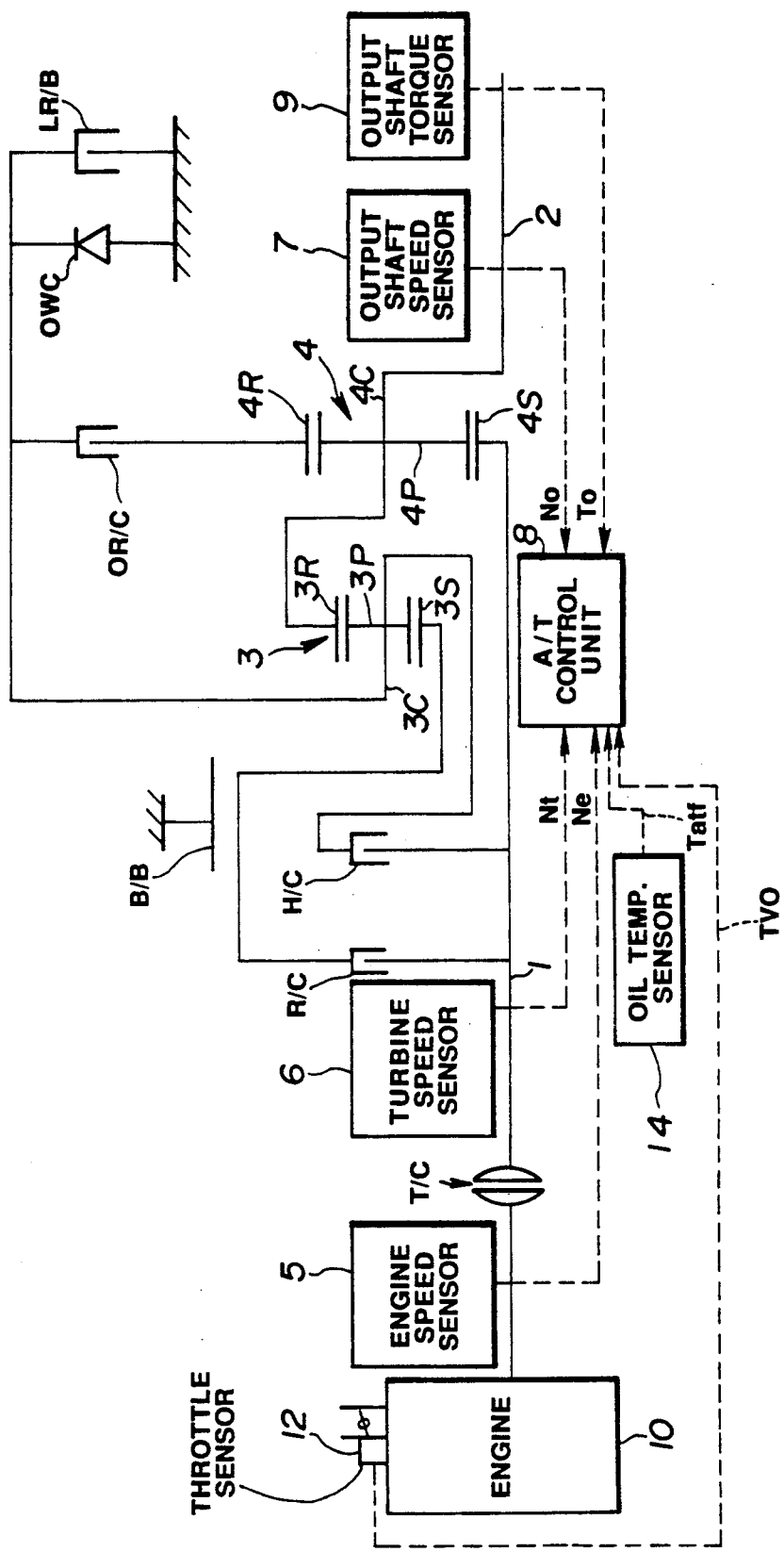
FIG. 1 is a schematic view showing a portion of an automotive vehicle having an engine and an automatic transmission.

FIG. 1 shows a four speed automatic transmission of an automotive vehicle having an engine with a throttle which opens in degrees in response to manipulation of an accelerator pedal, not shown. The automatic transmission has a torque converter T/C. The torque converter T/C includes as usual a pump impeller drivingly connected to the engine 10 and a turbine runner and a stator, not shown. The automatic transmission has an input shaft 1 drivingly connected to the turbine runner of the torque converter T/C and an output shaft 2. A plurality of hydraulically actuated friction elements OR/C, B/B, H/C, LR/B and R/C selectively hold components of one or more planetary gear sets 3 and 4 to produce four forward speed ratios and one reverse drive. The gear train of this automatic transmission is similar to a gear train described on pages I-53 to I-73 of a service manual (A261C07) "NISSAN FULL-RANGE ELECTRONICALLY CONTROLLED AUTOMATIC TRANSMISSION RE4R01A TYPE" published in March 1987 which has been hereby incorporated by reference for showing background of the invention. This known gear train has a forward clutch and a forward one-way clutch arranged between a pinion carrier of a front planetary gear set and a ring gear of a rear planetary gear set in parallel to an overrunning clutch. The gear train shown in FIG. 1 is different from this known one in that there are no forward clutch and forward one-way clutch in parallel to the overrunning clutch OR/C.

Referring to FIG. 1, a front or first planetary gear set 3 and a rear or second planetary gear set 4 are disposed between the input and output shafts 1 and 2. The first planetary gear set 3 includes a first sun gear 3S, a first ring gear 3R and a first pinion carrier 3C rotatably supporting a plurality of first pinions 3P, each meshing both the sun and ring gears 3S and 3R. The second planetary gear set 4 includes a second sun gear 4S, a second ring gear 4R and a second pinion carrier 4C rotatably supporting a plurality of second pinions 3P, each meshing both the sun and ring gears 4S and 4R. The second sun gear 4S is constantly connected to the input shaft 1. The input shaft 1 is selectively connectable via a high clutch H/C to the first carrier 3C and via a reverse clutch R/C to the first sun gear 3S. A brake band B/B is engageable to anchor the first sun gear 3S. A low reverse brake LR/B is engageable to anchor the first carrier 3C. A low one-way clutch OWC is arranged to prevent reverse rotation of the first carrier 3C. The before-mentioned overrunning clutch OR/C is engageable to connect the first carrier 3C to the second ring gear 4R. The first ring gear 3R is constantly connected to the second carrier 4C which in turn is constantly connected to the output shaft 2. The friction elements OR/C, B/B, H/C, LR/B and R/C are selectively engaged to produce the four forward speeds and one reverse as shown in the following Table.

|     | FRICTION ELEMENTS | | | | |
| --- | --- | --- | --- | --- | --- |
|     | OR/C | B/B | H/C | LR/B | R/C |
| 1ST | E | | | E | |
| 2ND | E | E | | | |
| 3RD | E | | E | | |
| 4TH | | E | E | | |
| REV | | | | E | E |

E ... Engagement

During a 1-2 upshift, the low reverse brake LR/B is released and the band brake B/B is engaged. During a 2-3 upshift, the band brake B/B is released and the high clutch H/C is engaged. Thus, the low reverse brake LR/B serves as a release element and the band brake B/B serves as an apply element during the 1-2 upshift. During the 2-3 upshift, the brand brake B/B serves as a release element and the high clutch H/C serves as an apply element.

In FIG. 1, there are shown an engine speed sensor 5, a turbine speed sensor 6, an output shaft speed sensor 7, an output shaft torque sensor 9, a throttle sensor 12 and an oil temperature sensor 14. The engine speed sensor 5 detects revolution speed of the engine 10 and generates an engine speed indicative signal Ne indicative of the detected revolution speed of the engine 10. The turbine speed sensor 6 detects revolution speed of the input shaft 1 and generates a turbine or input speed indicative signal Nt indicative of the detected revolution speed of the input shaft 1. The output shaft speed sensor 7 detects revolution speed of the output shaft 2 and generates an output speed indicative signal No indicative of the detected revolution speed of the output shaft 2. The output shaft torque sensor 9 detects torque of the output shaft 2 and generates an output torque indicative signal To indicative of the detected torque of the output shaft 2. The throttle sensor 12 detects opening degree of the engine throttle and generates throttle opening degree indicative signal TVO indicative of the detected opening degree of the engine throttle. The oil temperature sensor 14 detects temperature of the automatic transmission oil and generates an oil temperature indicative signal Taft indicative of the detected temperature of the automatic transmission oil (ATF).

These sensor signals Ne, Nt, No, To, TVO and Tatf are fed to an automatic transmission (A/T) control unit 8 which is a microcomputer based unit including, as usual, an input interface, a central processor unit (CPU), a read only memory (ROM), a random access memory (RAM), an output interface and data bus.

Figure 2:
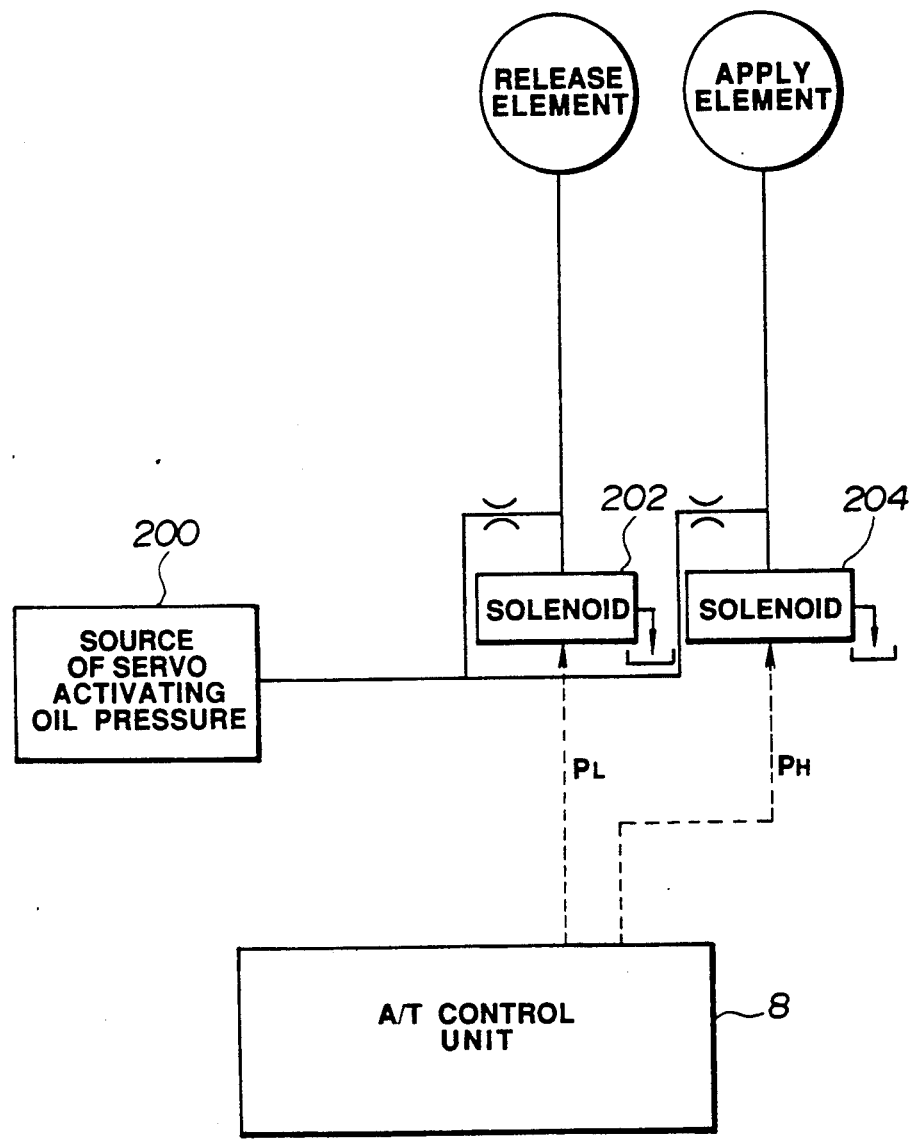
FIG. 2 is a schematic view of a portion of a hydraulic circuit of the automatic transmission.

Outputs of the A/T control unit 8 are used to activate a solenoid actuated pressure regulating module 202 for the release element and a solenoid actuated pressure regulating module 204 for the apply element as shown in FIG. 2. In FIG. 2, a servo activating oil pressure is supplied from a source 200 to the solenoid modules 202 and 204 via flow restrictors (or orifices), respectively. Under the A/T control unit 8, the solenoid modules 204 and 202 initiate progress of the engagement of the apply element after a command for a shift has been made with the release element kept engaged and subsequently release the release element upon generation of a release signal by the A/T control unit 8. During the 1-2 upshift, the release element is the low reverse brake LR/B and the apply element is the band brake B/B.

Figure 3:
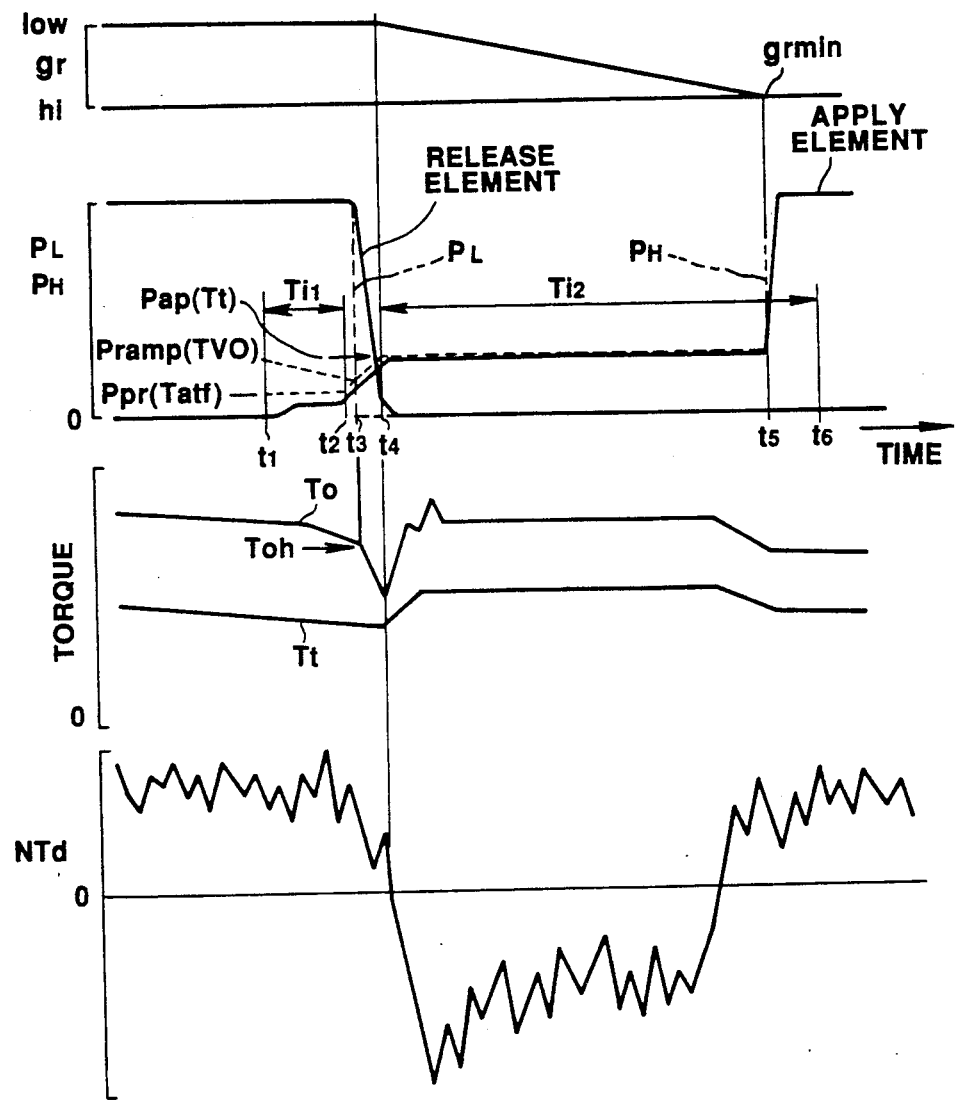
FIG. 3 is a time chart of an upshift.

The operation of the first embodiment is explained briefly along with FIG. 3.

Let us assume that the automatic transmission is conditioned to effect an automatic shift in a drive (D) range and the first speed is established prior to a moment t1. Thus, a gear ratio as indicated by the reference character (low) for the first speed is established prior to the moment t1. At the moment t1, a command for a 1-2 upshift is made. On or immediately after this moment t1, the A/T control unit 8 initiates progress of engagement of the apply element B/B with the release element LR/B kept engaged. During a period of time Ti1 from the moment t1, the target pressure $P_H$ for the apply element B/B is set to a precharge pressure Ppr(Tatf) which is a function of the oil temperature Tatf. With the precharge pressure Ppr, the apply element B/B is about to engage although it is not yet engaged to develop substantial torque. The precharge control is carried out during this period of time Ti1 after the moment t1. At a moment t2 upon expiration of the period of time Ti1, the precharge control ends and a ramp control begins in which the target pressure $P_H$ is increased by a rate Pramp(TVO) which is a function of the throttle opening degree TVO. As the apply element B/B gradually develops torque, the output torque To falls. At a moment t3 when the output torque To falls to a calculated inescapable drop Toh, a target pressure $P_L$ for the release element LR/B drops to zero, releasing or venting the release element LR/B immediately. This drop in the target pressure $P_L$ is regarded as generation of a release signal. On or after this moment t3, the target pressure $P_H$ is increased to a controlled charge pressure Pap(Tt) at which the apply element B/B develops sufficient torque to initiate change in speed ratio. In FIG. 3, a moment t4 indicates ending of torque phase which involves no change in speed ratio and beginning of inertia phase. After the moment t4, the gear ratio gr decreases. At a moment t5 when the gear ratio gr decreases to a gear ratio grmin to be established during the second speed, the target pressure $P_H$ for the apply element B/B is increased to the maximum level. If the gear ratio gr fails to decrease to grmin within a period of time Ti2 after the initiation of inertia phase, the target pressure $P_H$ for the apply element B/B is increased to the maximum level upon expiration of the period of time Ti2 (at a moment t6). The manner of calculating an inescapable drop Toh is explained. The inescapable drop Toh is expressed by the following equation:

$$Toh = grmin \times Tt + I \times NTd \quad (1)$$

where,
grmin: gear ratio after shift,
Tt: turbine torque,
I: inertia,
NTd: turbine acceleration.

The inertia I is a factor taking into account an inertia around the input shaft 1 and a gear ratio before shift. Using this equation, calculation of this value Toh is repeated between the moments t1 and t3. In FIG. 3, the rate of change in detected turbine speed indicative signal, i.e., turbine acceleration NTd, is plotted. In the above discussed example, the moment t3 occurs after expiration of the period of time Ti1. If the moment t3 occurs before expiration of the period of time Ti1, the apply element B/B is released immediately at the moment t3 before expiration of the period of time Ti1. In other words, the apply element B/B is released quickly during the torque phase.

Figure 4:
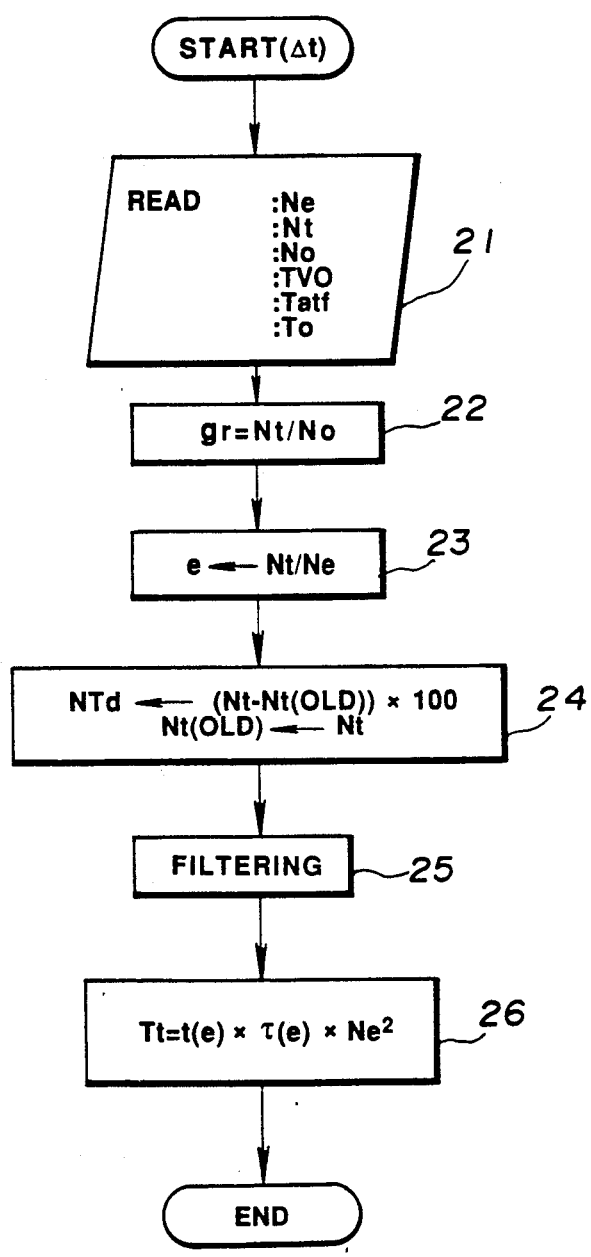
FIG. 4 is a flow diagram of a signal processing routine for reading signals and calculating variables.
Figure 5:
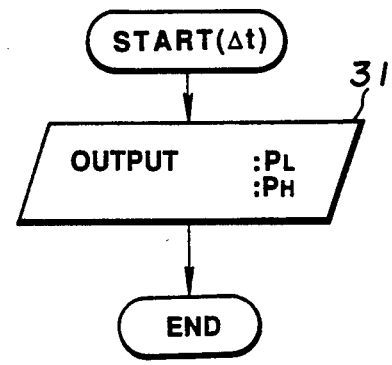
FIG. 5 is a flow diagram of a signal output routine for outputting signals based on target hydraulic pressure values $P_L$ and $P_H$.
Figure 6:
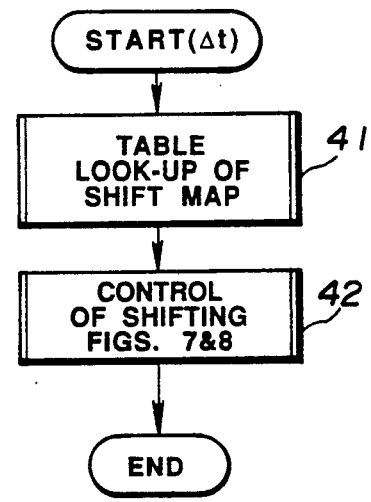
FIG. 6 is a flow diagram of a shift decision and control routine.

The operation of this embodiment is explained in detail along with the flow diagrams shown in FIGS. 4 to 8. The ROM of the A/T control unit 8 stores programs as illustrated in FIGS. 4 to 8. Execution of each of the routines shown in FIGS. 4, 5 and 6 is repeated upon expiration of delta t, namely 10 milliseconds in this embodiment.

Executing the signal processing routine shown in FIG. 4 involves reading operations of Ne (engine speed), Nt (turbine speed), No (output speed), TVO (throttle opening degree), Tatf (oil temperature) and To (output torque) at a step 21. At a step 22, a gear or speed ratio gr, as expressed by the equation gr=Nt/No, is calculated. At a step 23, a torque converter speed ratio e, as expressed by the equation e=Nt/Ne, is calculated. At a step 24, the turbine acceleration (a first derivative of turbine speed Nt) NTd is given by calculating $(Nt-Nt(OLD))\times 100$ and then the present data Nt is stored as the previous data Nt(OLD). At a step 25, filtering is performed to remove unnecessary fluctuations or errors of the data NTd. At a step 26, table look-up operations are performed based on the speed ratio e to find a torque ratio t(e) and a torque capacity coefficient $\tau(e)$, tau (e), and a turbine torque Tt as expressed by the equation $Tt=t(e)\times\tau(e)\times Ne^2$ is calculated.

Executing the output routine shown in FIG. 5 involves outputting target pressure $P_L$ for the release element LR/B and target pressure $P_H$ for the apply element B/B at a step 31.

Executing the shift decision and control routine shown in FIG. 6 involves a table look-up operation of a shift map at a step 41. As a result of the table look-up operation at the step 41, a desired gear ratio or speed is determined. Then, the desired gear ratio is compared with the calculated gear ratio gr and a command for a shift is made when the actual gear ratio gr is different from the desired gear ratio. At a step 42, a release element and an apply element during the shift are determined and appropriate shift control strategy is selected. In this example, it is assumed that a command for a 1-2 upshift is made and routines shown in FIGS. 7 and 8 are set ready for execution to perform the control strategy which has been briefly explained before along with the time chart shown in FIG. 3.

Figure 7:
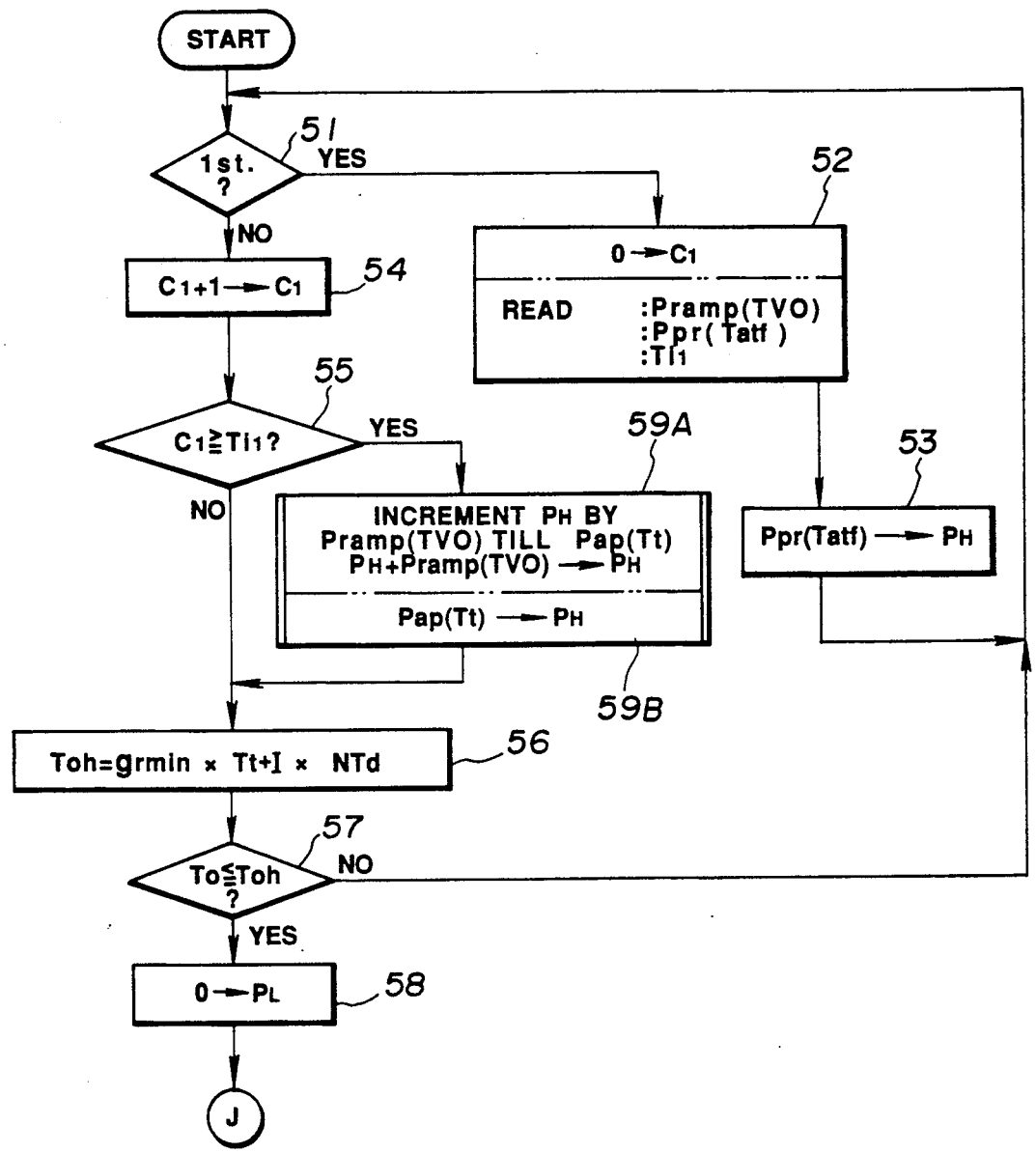
FIGS. 7 and 8 are a detailed flow diagram illustrating how to control shifting during torque phase and inertia phase.
Figure 8:
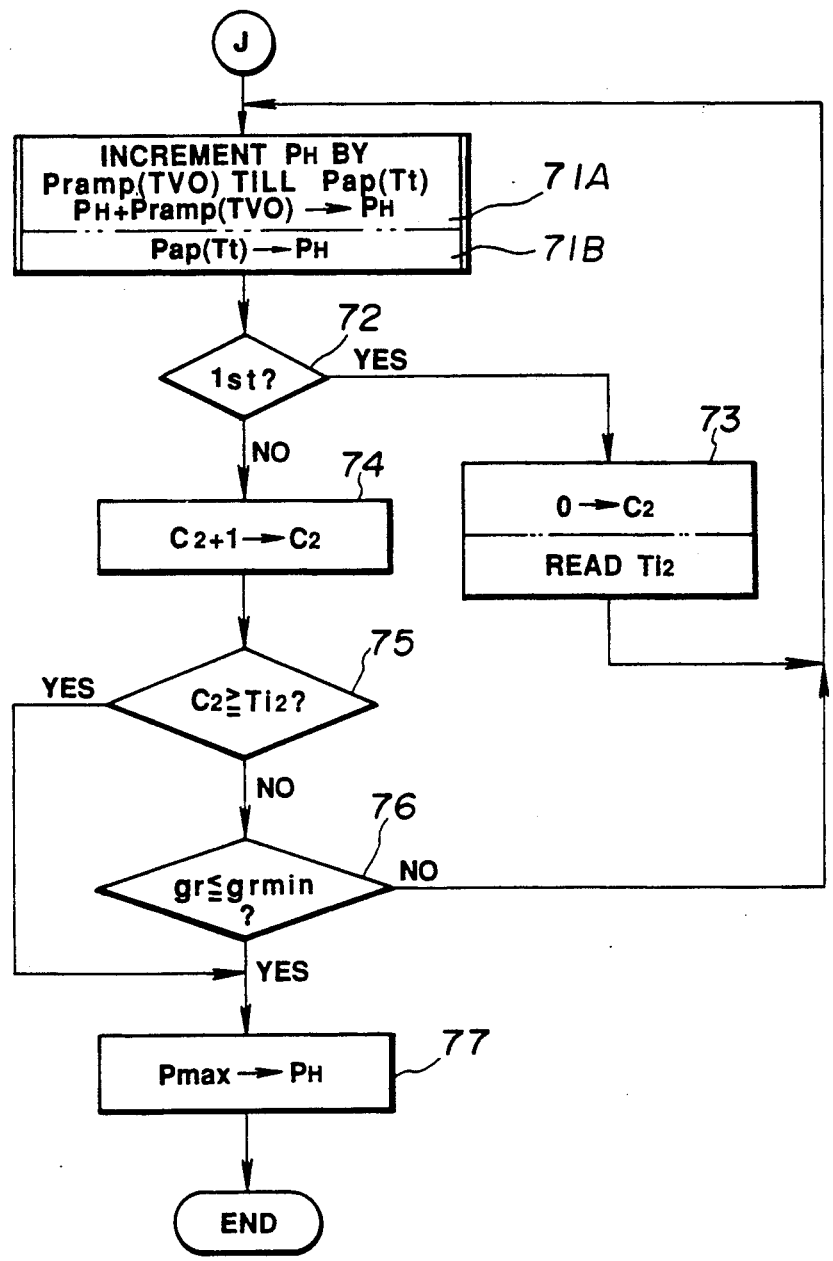

On or immediately after the moment t1, the first run of the routine shown in FIGS. 7 and 8 is executed. In FIG. 7, there is an interrogation at a step 51 whether the present run is the first one or not. Since this is the first run, the routine proceeds to a step 52 where a counter C1 is reset and a rate (ramp) Pramp(TVO), a precharge pressure Ppr(Tatf) and a precharge period of time Ti1 are read out of stored data. Then, the routine proceeds to a step 53 where the precharge pressure Ppr(Tatf) is set as the target pressure $P_H$ for the apply element B/B and the first run ends.

In each of the next and onward runs, the interrogation at the step 51 results in negative and the counter C1 is incremented at a step 54 and the counter C1 is compared with the precharge period of time Ti1 at a step 55. There is an interrogation at the step 55 whether C1 is greater than or equal to Ti1 or not. Between the moments t1 and t2 (see FIG. 3), the interrogation at the step 55 always results in negative and the routine proceeds to a step 56 where the inescapable drop Toh as expressed by the equation (1) is calculated. After this step 56, there is an interrogation whether the output torque To falls to the calculated instantaneous drop Toh or not. If this interrogation at the step 58 results in negative, the routine returns to a start point. At the moment t2 (see FIG. 3) when the interrogation at the step 55 results in affirmative, the ramp control is initiated. At a step 59A, the target pressure $P_H$ is increased by the rate Pramp(TVO) till the target pressure $P_H$ reaches the controlled charge pressure Pap(Tt). Alternatively, instead of the ramp control, the controlled charge pressure control is initiated. In this case, after the interrogation at the step 55, a step 59B is performed. At the step 59B, the controlled charge pressure Pap(Tt) is set as the target pressure $P_H$ for the apply element B/B. After the step 59A (or 59B), the routine proceeds to the step 56 to update inescapable drop Toh before proceeding to the interrogation at the step 57. If the output torque To drops to Toh (at the moment t3 in FIG. 3), the interrogation at the step 57 results in affirmative and the routine proceeds to a step 58. At the step 58, zero is set as the target pressure $P_L$ for the release element LR/B, causing venting of the release element LR/B. This is the moment when torque phase ends and inertia phase begins. Then, the routine proceeds to step 71A (or 71B) in FIG. 8. The ramp control continues if the step 71A is performed, while the controlled charge pressure control continues if the step 71B is performed. After this step 71A (or 71B), there is an interrogation at a step 72 whether this run is the first or not. Since this is the case, the program proceeds to a step 73 before returning to a junction J. At the step 73, another counter C2 is cleared and another period of time Ti2 is read. In each of next and onward runs, the interrogation at the step 72 results in negative and the program proceeds to a step 74 where the counter C2 is incremented. After the step 74, there is another interrogation whether the counter C2 is greater than or equal to Ti2 or not. Between the moments t4 and t6 (see FIG. 3), the interrogation at the step 75 results in negative and thus the routine proceeds to a step 76. At the step 76, there is another interrogation whether the gear ratio gr has decreased to grmin or not. Prior to the moment t5, the interrogation at the step 76 results in negative. At the moment t5 (see FIG. 3), the interrogation at the step 76 results in affirmative and the routine proceeds to a step 77. At the step 77, the maximum pressure value Pmax that is sufficiently higher than required for torque requirement is set as the target pressure $P_H$ for the apply element B/B. At the moment t6 upon expiration of the period of time Ti2, the routine proceeds from the interrogation step 75 to the step 77 to set the Pmax as $P_H$.

The second embodiment is explained in connection with FIGS. 1, 2, 9 and 10. In this embodiment, the output shaft torque sensor 9 is removed. According to this second embodiment, instead of comparing the output torque To with the calculated inescapable drop Toh, an output acceleration is calculated out of the output speed No and this calculated acceleration is compared with a predetermined value D. The predetermined value D is fixed in this embodiment. Preferably, this value D may be accelerator position dependent.

Figure 9:
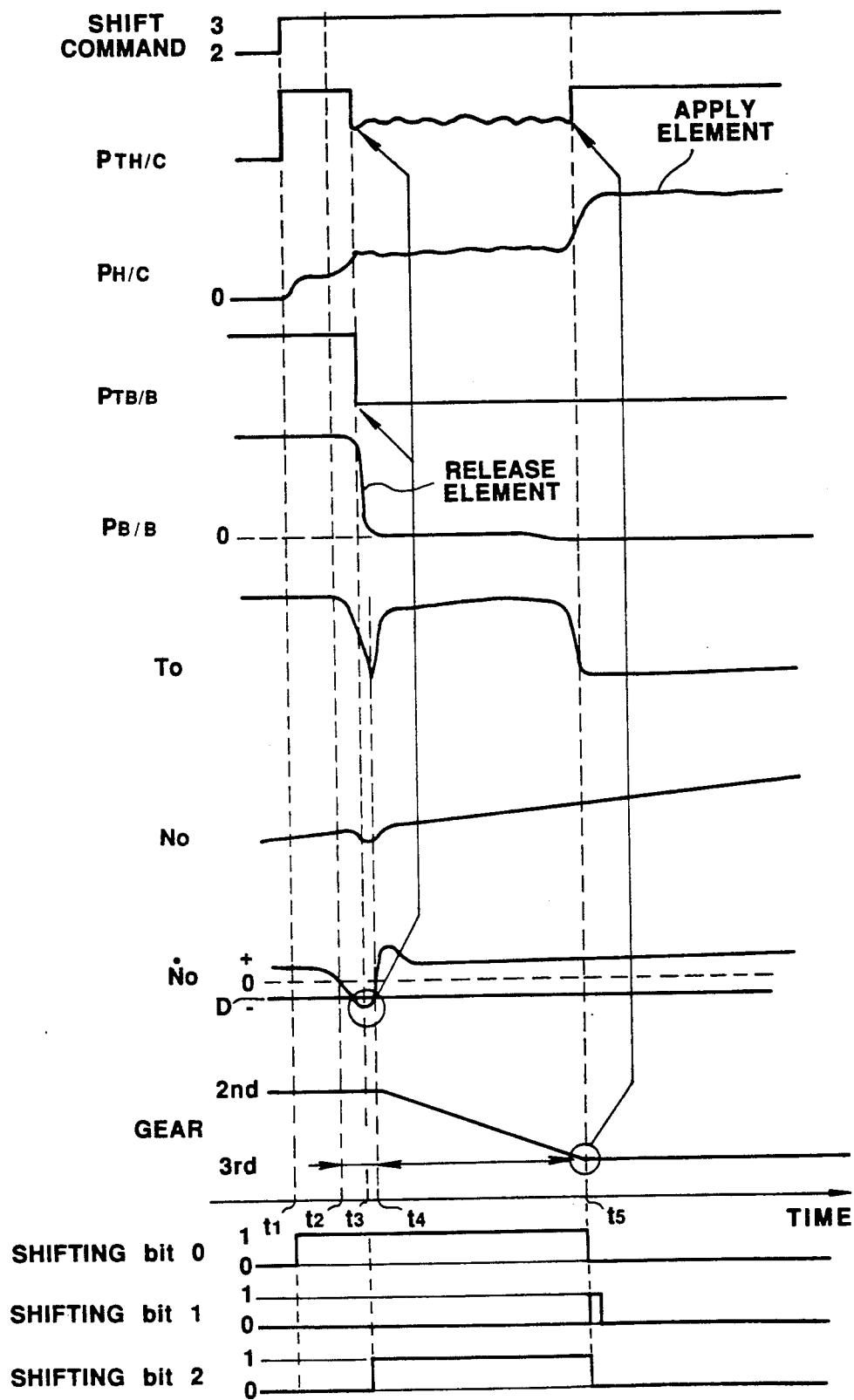
FIG. 9 is a time chart of an upshift.

The operation of the second embodiment is explained briefly along with FIG. 9.

Let us assume that the second speed is established prior to a moment t1. At the moment t1, a command for a 2-3 upshift is made. On or immediately after this moment t1, the A/T control unit 8 initiates progress of engagement of the apply element H/C with the release element B/B kept engaged. After the moment t1, the target pressure $P_{TH/C}$ for the apply element H/C is set to a maximum pressure level MAX. As the apply element H/C gradually develops torque, the output torque To falls and the output speed No falls. In order to recognize this change at an early stage, the output acceleration Ṅo (No overdot) is calculated and plotted in FIG. 9. At a moment t3 when the calculated output acceleration Ṅo (No overdot) falls to the predetermined value D, a target pressure $P_{TB/B}$ for the release element B/B drops to zero, releasing or venting the release element B/B immediately. This drop in the target pressure $P_{TB/B}$ is regarded as generation of a release signal. On or after this moment t3, the target pressure $P_{TH/C}$ is decreased to a controlled charge pressure level. In FIG. 9, a moment t4 indicates ending of torque phase which involves any change in gear ratio and beginning of inertia phase. At a moment t5 when the gear ratio decreases to a gear ratio to be established during the third speed, the target pressure $P_{TH/C}$ for the apply element H/C is increased to the maximum level (MAX.).

At the bottom portion of FIG. 9, three SHIFTING bits 0, 1 and 2 are shown. The SHIFTING bit 0 is set between the moments t1 and t5. The SHIFTING bit 1 is set momentarily at the moment t5. This SHIFTING bit 2 is set between the moments t3 and t5.

The operation of the second embodiment is explained in detail along with the flow diagram shown in FIG. 10.

In FIG. 10, there is an interrogation at a step 100 whether the SHIFTING bit 0 is 1 or not. In another routine, the SHIFTING bit 0 is set in response to the command for the 2-3 upshift. If the interrogation at the step 100 results in affirmative, the routine proceeds to a step 101. At the step 101, it is determined whether the shift has been completed or not and the SHIFTING bit 1 is set upon completion of the shift. There is another interrogation at a step 102 whether the SHIFTING bit 1 is set or not. Upon or immediately after the moment t1 (see FIG. 9), the interrogation at the step 102 results in negative and the routine proceeds to a step 105. At the step 105, there is an interrogation whether the SHIFTING bit 2 is set or not. Between the moments t1 and t3 (see FIG. 9), the interrogation at the step 105 results in negative and the routine proceeds to step 106 and onwards. At the step 106, the output speed No is read from the sensor signal of the output shaft sensor 7 (see FIG. 1). At the next step 107, a rate of change or first derivative of the data No is calculated and the result Ṅo (No overdot) is set as an output acceleration alpha. There is an interrogation at a step 108 whether alpha falls to the predetermined value D. Since the interrogation at the step 108 results in negative between the moments t1 and t3, the maximum pressure level MAX. is set as the target pressure $P_{TH/C}$ for the apply element H/C. At a step 114, the target pressure $P_{TH/C}$ for the apply element H/C and the target pressure $P_{TB/B}$ for the release element B/B are outputted. On or immediately after the moment t3, the interrogation at the step 108 results in affirmative and the routine proceeds to steps 109, 110, 113 and 114. At the step 109, the SHIFTING bit 2 is set. At the step 110, zero is set as the target pressure $P_{TB/B}$ for the release element B/B. At a step 113, the target pressure $P_{TH/C}$ for the apply element H/C is set to the controlled charge pressure. Thus, the release element B/B is released rapidly at the moment t3. On or immediately after the moment t5, the SHIFTING bit 1 is reset at the step 101. Thus, the interrogation at the subsequent step 102 results in affirmative and the routine proceeds to steps 103, 104 and 114. At the step 102, the SHIFTING bits 0, 1 and 2 are all reset. At the step 104, the maximum pressure level MAX. is set as the target pressure $P_{TH/C}$ for the apply element H/C. Thus, the pressure applied to the apply element H/C is increased to the maximum pressure level after the moment t5 (see FIG. 9).

What is claimed is:

1. A method of shift control for an automatic transmission having an input shaft, an output shaft and a plurality of friction elements, the automatic transmission effecting an upshift from one gear ratio wherein the output shaft rotates at one speed ratio with regard to the input shaft to another gear ratio wherein the output shaft rotates at another speed ratio, higher than the one speed ratio, with regard to the input shaft, the plurality of friction elements including one which serves as a release element during the upshift and another which serves as an apply element during the upshift, the method comprising the steps of:
   supplying hydraulic fluid to initiate progress of engagement of the apply element;
   detecting a torque to which the output shaft is subject;
   determining whether said detected torque reaches a predetermined value; and
   releasing the release element upon determining said detected torque reaching said predetermined value.

2. A method of a shift control for an automatic transmission having an input shaft, an output shaft and a plurality of friction elements, the automatic transmission effecting an upshift from one gear ratio wherein the output shaft rotates at one speed ratio with regard to the input shaft to another gear ratio wherein the output shaft rotates at another speed ratio, higher than the one speed ratio, with regard to the one speed ratio, the plurality of friction elements including one which serves as a release element during the upshift and another which serves as an apply element during the upshift, the method comprising the steps of:
   supplying hydraulic fluid to initiate progress of engagement of the apply element;
   detecting a revolution speed of the output shaft;
   calculating an acceleration out of said detected revolution speed;
   determining whether said calculated acceleration reaches a predetermined value; and
   releasing the release element upon determining said calculated acceleration reaching said predetermined value.

3. A method of a shift control for an automatic transmission of an automotive vehicle having an engine, the automatic transmission having a torque converter having a pump impeller drivingly connected to the engine and a turbine runner, an input member drivingly connected to the turbine runner, an output member and a plurality of friction elements, the plurality of friction elements including one which serves as a release element during a shift and another which serves as an apply element during the shift, the automatic transmission effects the shift wherein the release element is released and the apply element is engaged, the method comprising the steps of:

detecting torque of the output member and generating an output torque indicative signal indicative of said detected torque of the output member;

detecting revolution speed of the engine and generating an engine speed indicative signal indicative of said detected revolution speed of the engine;

detecting revolution speed of the input member and generating a turbine speed indicative signal indicative of said detected revolution speed of the input member;

calculating torque of the input member out of said engine speed indicative signal and said turbine speed indicative signal and generating a turbine torque indicative signal of said calculated torque of the input member;

calculating a first derivative of said turbine speed indicative signal and generating a turbine acceleration indicative signal indicative of said calculated first derivative of said turbine speed indicative signal;

determining a ratio of revolution speed of the input member to revolution speed of the output member of be established after completion of the shift and generating a gear ratio indicative signal indicative of said ratio determined;

calculating an inescapable torque drop out of said gear ratio indicative signal, said turbine torque indicative signal and said turbine acceleration indicative signal and generating an inescapable torque drop indicative signal indicative of said calculated inescapable torque drop;

comparing said output torque indicative signal with said inescapable torque drop indicative signal and generating a release signal when said output torque indicative signal satisfies a predetermined relationship with said inescapable torque drop indicative signal; and releasing the release element in response to said release signal.

4. A method as claimed in claim 3, wherein said step of calculating said inescapable torque drop includes the sub steps of:

calculating a product of said gear ratio indicative signal and said output torque indicative signal;

calculating a product of said turbine acceleration indicative signal and a factor taking into account an inertia of the input member and a ratio of revolution speed of the input member to revolution speed of the output member before the shift; and calculating a sum of said products calculated.

5. A method of a shift control for an automatic transmission of an automotive vehicle having an engine, the automatic transmission having a torque converter having a pump impeller drivingly connected to the engine and a turbine runner, an input shaft drivingly connected to the turbine runner, an output shaft and a plurality of friction elements, the automatic transmission effecting an upshift from one gear ratio wherein the output shaft rotates at one speed ratio with regard to the input shaft to another gear ratio wherein the output shaft rotates at another speed ratio, higher than the one speed ratio, with regard to the one speed ratio, the plurality of friction elements including one which serves as a release element during the upshift and another which serves as an apply element during the upshift, the method comprising the steps of:

supplying hydraulic fluid to initiate progress of engagement of the apply element;

detecting a revolution speed of the output shaft and generating an output speed indicative signal indicative of said detected revolution speed of the output shaft;

calculating a first derivative of said output speed indicative signal and generating a vehicle acceleration indicative signal indicative of said calculated first derivative of said output speed indicative signal;

comparing said vehicle acceleration indicative signal with a predetermined drop and generating a release signal when said vehicle acceleration indicative signal satisfies a predetermined relationship with said predetermined drop; and releasing the release element in response to said release signal.

6. A transmission control system comprising:

an automatic transmission having an input shaft, an output shaft and a plurality of friction elements, said automatic transmission effecting an upshift from one gear ratio wherein said output shaft rotates at one speed ratio with regard to said input shaft to another gear ratio wherein said output shaft rotates at another speed ratio, higher than the one speed ratio, with regard to said input shaft, said plurality of friction elements including one which serves as a release element during said upshift and another which serves as an apply element during said upshift;

means for detecting a torque to which said output shaft is subject;

a control unit including, means for generating an apply signal after a command for said upshift has been made; and means for determining whether said detected torque reaches a predetermined value and generating a release signal upon determining said detected output torque reaching said predetermined value; and means for initiating progress of engagement of said apply element upon generation of said apply signal with said release element kept engaged and subsequently releasing said release element upon generation of said release signal.

7. A transmission control system comprising:

an automatic transmission having an input shaft, an output shaft and a plurality of friction elements, said automatic transmission effecting an upshift from one gear ratio wherein said output shaft rotates at one speed ratio with regard to said input shaft to another gear ratio wherein said output shaft rotates at another speed ratio, higher than the one speed ratio, with regard to said input shaft, said plurality of friction elements including one which serves as a release element during said upshift and another which serves as an apply element during said upshift;

means for detecting a revolution speed of said output shaft;

a control unit including, means for generating an apply signal after a command for said upshift has been made;

means for calculating an acceleration out of said detected revolution speed; and means for determining whether said calculated acceleration reaches a predetermined value and generating a release signal upon determining said calculated acceleration reaching said predetermined value; and means for initiating progress of engagement of said apply element upon generation of said apply signal with said release element kept engaged and subsequently releasing said release element upon generation of said release signal.

8. A system for a shift control for an automatic transmission of an automotive vehicle having an engine, the automatic transmission having a torque converter having a pump impeller drivingly connected to the engine and a turbine runner, an input member drivingly connected to the turbine runner, an output member and a plurality of friction elements, the plurality of friction elements including one which serves as a release element during a shift and another which serves as an apply element during the shift, the automatic transmission effects the shift wherein the release element is released and the apply element is engaged, the system comprising:

means for detecting torque of the output member and generating an output torque indicative signal indicative of said detected torque of the output member;

means for detecting revolution speed of the engine and generating an engine speed indicative signal indicative of said detected revolution speed of the engine;

means for detecting revolution speed of the input member and generating a turbine speed indicative signal indicative of said detected revolution speed of the input member;

a control unit including, means for generating an apply signal after a command for the shift has been made;

means for calculating torque of the input member out of said engine speed indicative signal and said turbine speed indicative signal and generating a turbine torque indicative signal indicative of said calculated torque of the input member;

means for calculating a first derivative of said turbine speed indicative signal and generating a turbine acceleration indicative signal indicative of said calculated first derivative of said turbine speed indicative signal;

means for determining a ratio of revolution speed of the input member to revolution speed of the output member to be established after completion of the shift and generating a gear ratio indicative signal indicative of said ratio determined;

means for calculating an inescapable torque drop out of said gear ratio indicative signal, said turbine torque indicative signal and said turbine acceleration indicative signal and generating an inescapable torque drop indicative signal indicative of said calculated inescapable torque drop; and means for comparing said output torque indicative signal with said inescapable torque drop indicative signal and generating a release signal when said output torque indicative signal satisfies a predetermined relationship with said inescapable torque drop indicative signal; and means for initiating progress of engagement of the apply element upon generation of said apply signal with the release element kept engaged and releasing the release element upon generation of said release signal.

9. A transmission control system comprising:

an automatic transmission having an input shaft, an output shaft and a plurality of friction elements, said automatic transmission effecting an upshift from one gear ratio wherein said output shaft rotates at one speed ratio with regard to said input shaft to another gear ratio wherein said output shaft rotates at another speed ratio, higher than the one speed ratio, with regard to said input shaft, said plurality of friction elements including one which serves as a release element during said upshift and another which serves as an apply element during said upshift;

means for detecting a revolution speed of said output shaft and generating an output speed indicative signal indicative of said detected revolution speed of said output shaft;

a control unit including, means for generating an apply signal after a command for said upshift has been made;

means for calculating a first derivative of sad output speed indicative signal and generating a vehicle acceleration indicative signal indicative of said calculated first derivative of said output speed indicative signal; and means for comparing said vehicle acceleration indicative signal with a predetermined drop and generating a release signal when said vehicle speed indicative signal satisfies a predetermined relationship with said predetermined drop; and means for initiating progress of engagement of said apply element upon generation of said apply signal with said release element kept engaged and subsequently releasing said release element upon generation of said release signal.

10. In an automatic transmission of an automotive vehicle having an engine, the automatic transmission having a torque converter having a pump impeller drivingly connected to the engine and a turbine runner, an input member drivingly connected to the turbine runner, an output member and a plurality of friction elements, the plurality of friction elements including one which serves as a release element during a shift and another which serves as an apply element during the shift, the automatic transmission effects the shift wherein the release element is released and the apply element is engaged:

means for detecting torque of the output member and generating an output torque indicative signal indicative of said detected torque of the output member;

means for detecting revolution speed of the engine and generating an engine speed indicative signal indicative of said detected revolution speed of the engine;

means for detecting revolution speed of the input member and generating a turbine speed indicative signal indicative of said detected revolution speed of the input member;

a control unit including, means for generating an apply signal after a command for the shift has been made;

means for calculating torque of the input member out of said engine speed indicative signal and said turbine speed indicative signal and generating a turbine torque indicative signal indicative of said torque of the input member;

means for calculating a first derivative of said turbine speed indicative signal and generating a turbine acceleration indicative signal indicative of said calculated first derivative of said turbine speed indicative signal;

means for determining a ratio of revolution speed of the input member to revolution speed of the output member to be established after completion of the shift and generating a gear ratio indicative signal indicative of said ratio determined;

means for calculating an inescapable torque drop out of said gear ratio indicative signal, said turbine torque indicative signal and said turbine acceleration indicative signal and generating an inescapable torque drop indicative signal indicative of said calculated inescapable torque drop; and means for comparing said output torque indicative signal with said inescapable torque drop indicative signal and generating a release signal when said output torque indicative signal satisfies a predetermined relationship with said inescapable torque drop indicative signal; and means for initiating progress of engagement of the apply element upon generation of said apply signal with the release element kept engaged and releasing the release element upon generation of said release signal.

11. A transmission control system comprising:

an automatic transmission having an input shaft, an output shaft and a plurality of friction elements, said automatic transmission effecting an upshift from one gear ratio wherein said output shaft rotates at one speed ratio with regard to said input shaft to another gear ratio wherein said output shaft rotates at another speed ratio, higher than the one speed ratio, with regard to said input shaft, said plurality of friction elements including one which serves as a release element during said upshift and another which serves as an apply element during said upshift;

means for detecting a revolution speed of said output shaft and generating an output speed indicative signal indicative of said detected revolution speed of output shaft;

a control unit including, means for generating an apply signal after a command for said upshift has been made;

means for calculating a first derivative of said output speed indicative signal and generating a vehicle acceleration indicative signal indicative of said calculated first derivative of said output speed indicative signal; and means for comparing said vehicle acceleration indicative signal with a predetermined drop and generating a release signal when said vehicle acceleration indicative signal satisfies a predetermined relationship with said predetermined drop; and means for initiating progress of engagement of the apply element upon generation of said apply signal with the release element kept engaged and releasing the release element upon generation of said release signal.

* * * * *